Dec. 29, 1964    J. LIEBERMANN    3,163,021
THERMOSTATIC CONTROL CIRCUIT FOR REVERSIBLE HEAT PUMPS
Filed Aug. 14, 1963
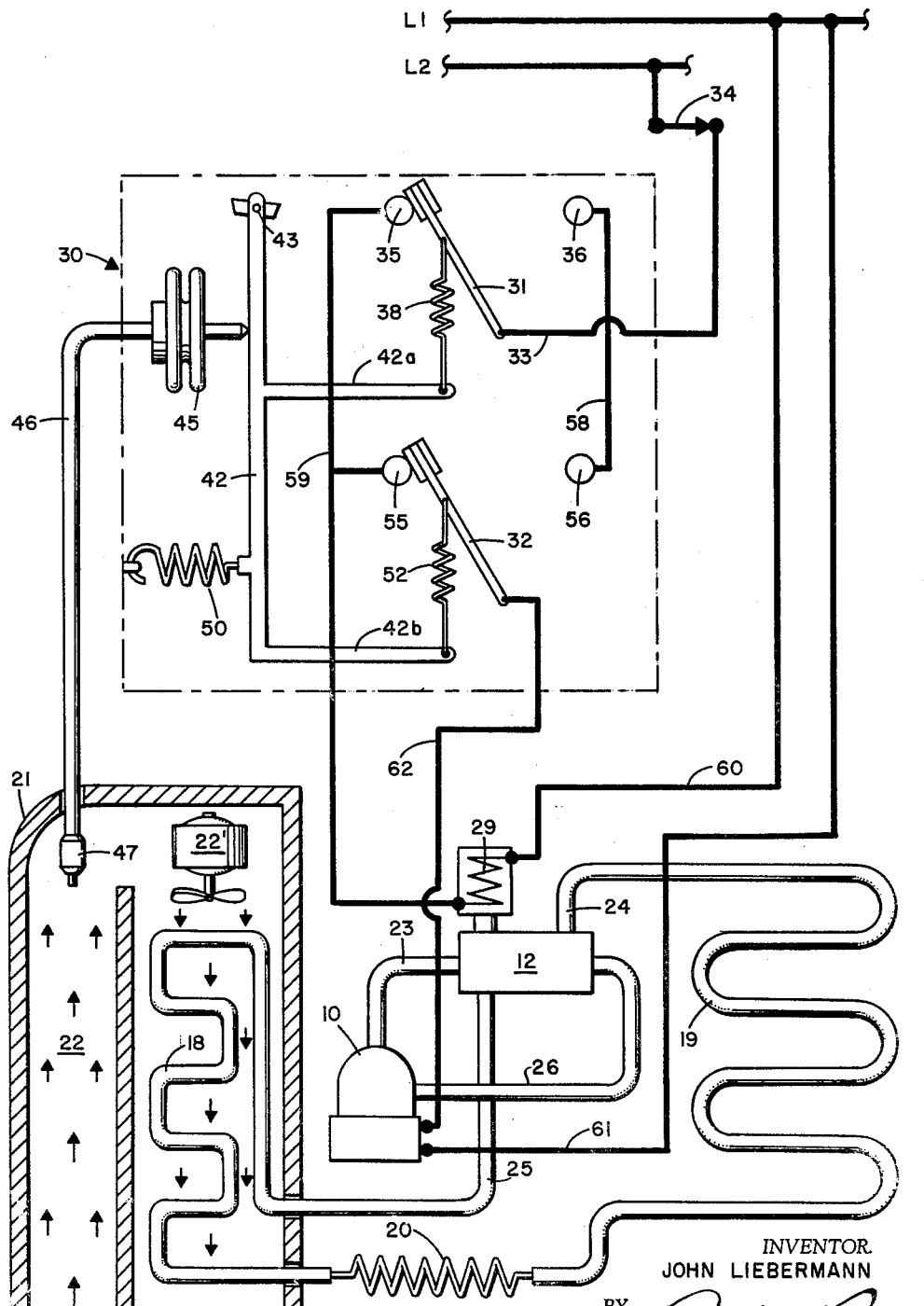
INVENTOR.
JOHN LIEBERMANN
BY
Roy E. Raney
ATTORNEY United States Patent Office 3,163,021
Patented Dec. 29, 1964

3,163,021
THERMOSTATIC CONTROL CIRCUIT FOR REVERSIBLE HEAT PUMPS
John Liebermann, Columbus, Ohio, assignor to Ranco Incorporated, Columbus, Ohio, a corporation of Ohio
Filed Aug. 14, 1963, Ser. No. 302,135
2 Claims. (Cl. 62—160)

This invention relates generally to the thermostatic control of reversible heat pump systems for maintaining a given temperature range in a space and comprising an electric motor driven compressor-condenser-expander type refrigerating system having electrically actuated means to reverse the order of flow of refrigerant through two heat exchangers, one being located exteriorly of the space and the other in heat exchange relation with the air in the space and each of which is alternatively operable as a condenser or as an evaporator. More particularly, the present invention relates to improved thermostatic control circuitry for controlling the energization of the compressor motor and the refrigerant flow reversing means so as to automatically condition the system for heating or cooling the space, as conditions require and then thermostatically cycle the compressor motor to maintain temperatures in the space concerned within a predetermined differential without corresponding cycling of the reversing means.

Heretofore, in thermostatically controlled heat pump systems of the type mentioned, during the cooling phase, the reversing means remains inoperative during cycling of the compressor motor. During the heating phases, the reversing means would be energized and deenergized concurrently with energization and deenergization of the compressor motor. Usually the electrically operated refrigerant flow reversing means comprises a solenoid operated valve and the repeated and frequent cycling of the solenoid valve with each cycling of the electric motor during this one phase of operation of the system is objectionable because of the clicking noise made by the solenoid valve upon each actuation, because of the hissing noise in the valve caused by balancing refrigerant pressures upon completion of each running cycle, and because of undue wear imposed on the working parts of the solenoid valve.

It is an important object of this invention to provide improved control circuitry for reversible heat pump systems which overcomes the foregoing disadvantages by maintaining the solenoid valve in a deenergized condition as long as thermostatic means calls for one phase of tempering in the space, such as the cooling phase, and for maintaining the solenoid valve in an energized condition irrespective of cycling of the compressor motor as long as the thermostatic means calls for the other phase such as the heating phase.

Yet another object of this invention is the provision of improved thermostatic control circuitry of the foregoing character comprising two thermally responsive switches each having first and second operative positions, one of the switches having a relatively wide temperature differential and being operative in response to temperature changes in return air for example, to change the tempering phase of the system to provide heating whenever the temperature falls below the lower limit of the wide differential and to change the phase to cooling whenever the temperature exceeds the upper limit of the wider differential switch, the other of the switches having a narrower temperature differential within the wider differential of the one switch and operative to cycle the compressor drive motor to maintain the return air temperature within the narrower differential. In a preferred embodiment the switches are of the single pole double throw type and are connected in series with one another and with the motor to control energization thereof, the reversing valve being connected in series with one side only of the wider differential switch so as to remain energized as long as that switch is in one direction of throw and to remain deenergized as long as that switch is in the other diretcion of throw.

Other objects and advantages of the invention will become apparent from the following detailed description of a thermostatic control circuit embodying the invention, the description being read in conjunction with the accompanying sheets of drawings in which the single view provides a schematic illustration of a reversible heat pump system embodying the control circuitry of this invention.

In the form shown, the invention is employed to control the operation of a well known type of reverse cycle heating and cooling system for spaces such as rooms of a building, or the like. The system comprises a compressor-condenser-expander circuit including a motor-compressor 10, a reversing valve 12, an indoor heat exchanger 18, an outdoor heat exchanger 19, and a capillary 20 providing flow restriction between the heat exchangers. The outdoor heat exchanger 19 is in contact with the outdoor air while the indoor heat exchanger is located in a housing 21 which includes a wall 21′ forming an air duct 22 through which air is drawn by a fan 22′ from the room or space to be tempered and directed over the heat exchanger 18 and recirculated into the room or space.

The heat exchangers 18 and 19 are each operable alternatively as the evaporator and as the condenser of the system in accordance with whether heating or cooling is to be effected in the space to be tempered. When the space is to be cooled, the indoor heat exchanger 18 serves as the evaporator while the outdoor exchanger 19 serves as the condenser. In that phase of operation refrigerant flow may be traced from the discharge side of the motor-compressor 10 through tube 23, reversing valve 12, tube 24, exchanger 19, capillary 20, exchanger 18, tube 25, reversing valve 12, and tube 26 to the intake side of the motor-compressor. During this phase, the exchanger 19 acts as the condenser wherein the refrigerant gives up heat to the out of doors air, and the exchanger 18 acts as the evaporator wherein the refrigerant takes on heat from the circulating indoor air which is cooled thereby.

The reversing valve 12, which may be of any suitable construction well known in the art, comprises an electrical solenoid 29 which is operable when energized to cause the valve to reverse the flow of refrigerant through the heat exchangers 18 and 19 and so to condition the system to effect heating of the indoor air as it flows over the heat exchanger 18 under the influence of fan 22′.

In accordance with this invention, the motor-compressor 10 is thermostatically cycled in response to changes in the temperature of air returning through return duct 22 to the fan 22′ so as to maintain the temperature in the space being tempered within a predetermined range. In addition, the solenoid valve 12 is thermostatically actuated in response to the temperature of the return air so as to condition the system to effect heating whenever the return air temperature falls below a predetermined minimum, and effect cooling whenever the return air temperature rises above a predetermined maximum.

To this end there is provided thermostatic switch means generally indicated at 30, and comprising first and second single pole, double throw switches 31 and 32. The switch 31, which is connected by a conductor 33 and an on-off switch 34 to power line L2, is shiftable between fixed contacts 35 and 36 by a snap acting mechanism which provides a predetermined temperature differential in its actuation between the fixed contacts. The actuation of the switch 31 is provided through the agency of an over-center acting spring 38 connected to an arm 42a of an operating lever 42. The operating lever 42, which is pivoted at 43, is positioned in accordance with the temperature of air in the return air duct 22 by a thermally responsive power means in the form of a bellows 45.

The bellows 45 is connected by a capillary tube 46 to a temperature sensing bulb 47 in the return air duct, and the bellows 45, tube 46, and bulb 47 are charged with a suitable thermally expanding fluid so that increases in air temperature in the return duct 22 will cause corresponding expansion of the bellows 45 and movement of the lever 42. The lever 42 is biased against the bellows 45 by a loading or range spring 50, the tension of which may be adjusted to vary the range of response of the device in a manner well known to those skilled in the art to which the invention pertains. In the present example, the switch 31 will remain engaged with contact 35 as long as the temperature of the return air is below 67° and will remain on the contact 36 as long as the temperature remains above 60°.

The switch 32, which is similar in construction to the switch 31, is actuated by a snap mechanism including an over-center spring 52 connected to an arm 42b of the operating lever 42.

Because of the relative positions of arms 42b and 42a along the operating lever 42, the switch 32 is characterized by a narrower temperature differential in the actuation thereof between contacts 55 and 56, and the switch 31 is characterized by a wider temperature differential in the actuation thereof between contacts 35 and 36. Moreover, the temperatures at which the switch 32 will be actuated lie between the temperatures at which the switch 31 is actuated. In this example, the switch 32 will remain engaged with contact 55 until the temperature rises above 64° at which time it will be snapped to contact 56 where it will remain until the temperature falls below 61°.

The contacts 36 and 56 are interconnected by a suitable conductor means 58 while the contacts 35 and 55 are interconnected by a conductor 59 which leads also to one side of the reversing valve solenoid 29. The other side of the solenoid 29 is connected by a conductor 60 to the power line L2. The motor-compressor 10 is connected by suitable energizing conductors 61 and 62 to the power line L1 and the switch 32, respectively, to complete the control circuitry.

Assuming the air in the return duct 22 to be below 60°, the switches 31 and 32 will be in their illustrated positions, and a solenoid valve energizing circuit may be traced from power line L1 through conductor 60, solenoid 29, conductor 59, contact 35 and switch 31, conductor 33 and switch 34 to line L2. This circuit actuates the solenoid valve 12 to condition the heat pump system to effect heating of the heat exchanger 18 and the air passing thereover. A motor energizing circuit may also be traced from power line L1 through conductor 61, motor 10, conductor 62, switch 32, contact 55, conductor 59, contact 35, switch 31, conductor 33, and switch 34 to power line L2. This circuit will energize the motor compressor 10 to effect the just mentioned heating of the air by the heat exchanger 18. As the temperature of the space to be heated increases, and the return air in duct 21 rises to 64°, the switch 32 will be snapped against contact 56 thereby terminating the operating cycle of the motor-compressor 10 and production of heat in exchanger 18. The switch 31, however, will remain against contact 35 maintaining the energization of the solenoid 29 and actuation of the valve 12. The temperature of the return air will gradually decrease to 61°, at which temperature the switch 32 will be returned to the contact 55 so as to energize the motor-compressor 10 and initiate another heating cycle of the system. Thereafter, the motor-compressor 10 will be cycled off and on by the switch 32 as necessary to maintain the space to be tempered at a desired temperature corresponding to return air temperature within the range of 61° to 64°.

If ambient or weather conditions increase the temperature of the room space so that the return air exceeds 67° even though the motor compressor 10 is idle, the switch 31 will be actuated to engage contact 36, thereby deenergizing the solenoid 29 and actuating the valve 12 to condition the system to effect cooling in the heat exchanger 18 upon operating of the motor-compressor 10. Simultaneously, engagement of the contact 36 by the switch 31 will effect a motor-compressor energizing circuit which will be traced from power line L1 through conductor 61, motor-compressor 10, conductor 62, switch 32, contact 56, conductor 58, contact 36, switch 31, conductor 33, and switch 34, to power line L2. The temperature of return air will thereupon be reduced until it is lowered to 61°, at which time the switch 32 will snap from contact 56 to contact 55, terminating the cooling cycle. Thereafter the switch 32 will cycle the motor-compressor as necessary to effect cooling to maintain the return air in the range of 61° to 64°, as long as the return air does not fall below 60°.

Should the return air fall below 60° because of changing ambient conditions or the like, the switch 31 will return to contact 35 thereby reestablishing the heating condition of the system in which condition the solenoid 29 remains energized although the motor-compressor is cycled on and off by switch 32 to maintain the return air between 61° and 64°.

From the foregoing detailed description of an exemplary thermostatic control circuit embodying the invention it will be appreciated that there has been provided thereby a particularly effective combination of thermally responsive switches which eliminates unnecessary cycling of the solenoid reversing valve, yet provides for automatic reversing of tempering phase and thermostatic control of the compressor drive motor to maintain temperatures within a desired range. Of course, it will be apparent to those skilled in the art to which the invention pertains that certain modifications, substitutions, and adaptations can be made without departing from the spirit of the invention. For example, the switches 31 and 32 may be operated by independent temperature responsive power means rather than from a single power means such as bellows 45. Similarly, the temperatures sensed may be other than the temperature of return air alone. For example, the switch 31 could be responsive to outside air temperatures while the switch 32 could be responsive to inside or room temperatures.

Accordingly, although the invention has been described in considerable detail with reference to a specific thermostatic control circuit embodying the invention, it will be understood that the invention is not limited thereto, but rather the invention includes all those modifications, adaptations, and uses as are reasonably embraced by the scope of the claims hereof.

Having described my invention, I claim:

1. In a reversible heat pump system for heating and cooling a space to be tempered,
   (a) refrigerant circulating means driven by an electric motor,
   (b) a reversing valve actuable to a first position for conditioning said system to effect heating of said space, and actuable to a second position for conditioning said system to effect cooling of said space,
   (c) an electrical solenoid connected to said valve, said solenoid being operative upon energization to effect actuation of said valve from one of said positions to the other of said positions and upon deenergization to effect actuation of said valve from the other of said positions to said one position,
   (d) thermally responsive power means comprising means for sensing temperature changes effected by said heating and cooling,
   (e) first switch means actuable by said power means and comprising a first contact electrically connected through said solenoid to one side of a source of electric power, a second contact, and a third contact electrically connected to the other side of said source, said third contact being alternatively engageable with said first and second contacts upon sensing of first and second temperatures, respectively, said first and second temperatures having a first predetermined differential therebetween, and (f) second switch means actuable by said power means and comprising a fourth contact electrically connected through said solenoid to said one side of said source, a fifth contact electrically connected to said second contact, and a sixth contact electrically connected through said electric motor to said one side of said source, said sixth contact being alternatively engageable with said fourth and fifth contacts upon sensing of third and fourth temperatures, respectively, said third and fourth temperatures having a second differential narrower than said first differential, and said third and fourth temperatures being between said first and second temperatures.

2. In a reversible heat pump system for heating and cooling a space to be tempered,
   (a) refrigerant circulating means driven by an electric motor,
   (b) a reversing valve actuable to a first position for conditioning said system to effect heating of said space, and actuable to a second position for conditioning said system to effect cooling of said space,
   (c) an electrical solenoid connected to said valve, said solenoid being operative upon energization to effect actuation of said valve to said first position and upon deenergization to effect actuation of said valve to said second position,
   (d) a single thermally responsive power means comprising means for sensing temperature changes effected by said heating and cooling,
   (e) first switch means actuable by said power means and comprising a first contact electrically connected through said solenoid to one side of a source of electric power, a second contact, and a third contact electrically connected to the other side of said source, said third contact being alternatively engageable with said first and second contacts upon sensing of a first predetermined low temperature and a first predetermined higher temperature, respectively, said first low and higher temperatures having a first predetermined differential therebetween, and (f) second switch means actuable by said power means and comprising a fourth contact electrically connected through said solenoid to said one side of said source, a fifth contact electrically connected to said second contact, and a sixth contact electrically connected through said electric motor to said one side of said source, said sixth contact being alternatively engageable with said fourth and fifth contacts upon sensing of a second predetermined low temperature and a second predetermined higher temperature, respectively, said second low and higher temperatures having a second differential narrower than said first differential, and said second low and higher temperatures being between said first low and higher temperatures.

References Cited in the file of this patent
UNITED STATES PATENTS

| 2,148,415 | Labberton | Feb. 21, 1939 |
| 2,182,691 | Crago | Dec. 5, 1939 |
| 2,771,748 | Prosek | Nov. 27, 1956 |